United States Patent [19]

Homburg

[11] Patent Number: 5,956,316

[45] Date of Patent: Sep. 21, 1999

[54] SYSTEM COMPRISING OPTICAL DISCS AND A SCANNING DEVICE

[75] Inventor: Fredericus G. A. Homburg, Eindhoven, Netherlands

[73] Assignee: U.S. Philips Corporation, New York, N.Y.

[21] Appl. No.: 08/859,797

[22] Filed: May 19, 1997

[30] Foreign Application Priority Data

Jun. 6, 1996 [EP] European Pat. Off. ............. 96201563

[51] Int. Cl.⁶ ..................................................... G11B 3/70
[52] U.S. Cl. ........................................... 369/282; 369/290
[58] Field of Search .................................. 369/270, 271, 369/282, 244, 280, 289, 290, 292

[56] References Cited

U.S. PATENT DOCUMENTS

| 5,199,014 | 3/1993 | Homberg et al. | 369/44.15 |
| 5,521,899 | 5/1996 | Taki | 369/244 |
| 5,533,000 | 7/1996 | Koizumi | 369/270 |
| 5,586,105 | 12/1996 | Mizuno et al. | 369/270 |
| 5,737,295 | 4/1998 | Lee | 369/103 |

FOREIGN PATENT DOCUMENTS

| 0464912A1 | 1/1992 | European Pat. Off. . |
| 0470807A1 | 2/1992 | European Pat. Off. . |
| 3-260934 | 11/1991 | Japan . |
| 09054964 | 2/1997 | Japan . |

*Primary Examiner*—A. J. Heinz
*Assistant Examiner*—Kenneth W. Fields
*Attorney, Agent, or Firm*—F. Brice Faller

[57] ABSTRACT

A system includes optical discs of a first type and optical discs of a second type having a transparent substrate with a thickness greater than that of the transparent substrate of the optical discs of the first type. The system further comprises a scanning device which is capable of scanning optical discs of both types and which comprises an actuator and an objective for focusing a radiation beam passing through the substrate of an optical disc so as to form a scanning spot (S) on an information surface. The actuator comprises a first actuator section and a second actuator section including the objective, which second actuator section is movable relative to the first actuator section. The system further comprises compensation means for compensating for the difference in thickness ($t_2-t_1$) between substrates of optical discs of said types, so that both during scanning of an optical disc of the first type and during scanning of an optical disc of the second type the second actuator section is movable starting from the same reference position for the purpose of focusing.

14 Claims, 7 Drawing Sheets

SYSTEM COMPRISING OPTICAL DISCS AND A SCANNING DEVICE

FIELD OF THE INVENTION

The invention relates to computer systems, and more specifically, the invention most closely relates to the field of compact disk subsystems in which a laser beam is used to generate signals from an information layer on optical computer media.

BACKGROUND OF THE INVENTION

A system includes optical discs, having an optically transparent substrate and an optically scannable information layer present on said substrate; and a scanning device for scanning the optical discs. The scanning device includes a turntable having a supporting surface for carrying optical disc and a scanning unit comprising an actuator and an objective. The objective has an optical axis for focusing a radiation beam passing through the substrate of an optical disc situated on the turntable so as to form a scanning spot on the information surface. The actuator comprises a first actuator section and a second actuator section including the objective. The second actuator section, for the purpose of focusing, is movable relative to the first actuator section in directions parallel to the optical axis.

Such a system is generally known in the form of the standardized "Compact Disc" system. This known system comprises optical discs—compact discs—having an information layer with a spiral track comprising a succession of pits and ridges. The information is stored in digital form in the track of a compact disc, the pits and ridges representing series of bits. The digital information on the compact disc is protected by a transparent substrate having a nominal thickness of 1.2 mm.

The "Compact Disc" system further includes players with a scanning device for the optical scanning of a compact disc. Such a scanning device is disclosed in, for example, EP-A 0 464 912 (U.S. Pat. No. 5,199,014). The scanning device comprises a turntable for supporting, centering and rotating a compact disc and further comprises an electro-optical scanning unit with an objective and an actuator for moving the lens. Optical scanning is effected by means of a solid-state laser source, the beam of laser light being focused on the information layer of the compact disc via the objective, the substrate being disposed between the objective and the information layer. Since the digital information on the compact disc is shielded by the substrate possible flaws and dust particles are not situated in the focal plane of the light beam which scans the disc, as a result they have comparatively little influence.

In order to achieve a correct focusing of the light beam, the actuator comprises a stationary actuator section and a movable actuator section and it comprises a drive assembly of a coil and a permanent magnet to move the objective in the direction of its optical axis. During focusing the movable actuator section performs translatory movements about a center position. A focus servo system provides the drive of the coil. In the course of time various types of optical discs, based on the "Compact Disc" standard, have been developed, such as CD-ROM, CD-I, CD-R, which all have a substrate of a thickness in conformity with the value specified in the standard. Recently, a digital video disc (DVD) has been proposed, which comprises two transparent substrates between which information layers are disposed. The substrates of said video disc each have a nominal thickness of 0.6 mm. Owing to the deviating substrate thickness this type of optical disc cannot readily be scanned by means of the scanning device of the known system.

SUMMARY OF THE INVENTION

It is an object of the invention to modify the known system so as to obtain a system in which optical discs having substantial differences in substrate thickness can be scanned by the same scanning device of the system.

A first embodiment of the system in accordance with the invention includes optical discs of a first type and optical discs of a second type, each of said optical discs having an optically transparent substrate and an optically scannable information layer present on the substrate. The substrate of an optical disc of the first type, at least in an area situated directly over the information layer, has a first substrate thickness ($t_1$) and the substrate of an optical disc of the second type, at least in an area situated directly over the information layer, has a second substrate thickness ($t_2$) greater than the first substrate thickness. The system also includes a scanning device which is capable of scanning optical discs of both types. The scanning device comprises a turntable having a supporting surface for carrying an optical disc of each of said types and a scanning unit. The scanning unit includes an actuator and an objective having an optical axis for focusing a radiation beam passing through the substrate of an optical disc situated on the turntable so as to form a scanning spot on the information surface. The actuator comprises a first actuator section and a second actuator section including the objective. The second actuator section is movable relative to the first actuator section. The system also includes a compensation apparatus (a compensator) for compensating for the difference in thickness ($t_2-t_1$) between substrates of optical discs of said types, so that both during scanning of an optical disc of the first type and during scanning of an optical disc of the second type the second actuator section is movable both in a first direction at least substantially parallel to the optical axis and in a second direction opposite to said first direction, starting from the same reference position for the purpose of focusing.

The compensator ensures at during scanning of an optical disc, regardless of its type, the focus of the radiation beam is always situated in the plane of the information surface of the optical disc to be scanned, without any special requirements having to be imposed on the actuator. The movable actuator section has only one neutral position or center position, which corresponds to the above-mentioned reference position, relative to which only a limited travel is required for a correct focusing.

It is to be noted that, in principle, it is possible to make the travel of the movable actuator section in a focusing direction so large that optical discs having different nominal thicknesses can be read without compensation. In such an actuator the movable actuator section in fact has two reference positions relative to which focusing movements are to be performed. A disadvantage of such a design is that it requires a more powerful and therefore usually more bulky and more expensive drive system than needed in the scanning device in the system in accordance with the invention, in which the movable actuator section has one fixed reference position. Moreover, such a design requires additional energy for at least performing an extra travel to cover the distance between the two reference positions. Moreover, in such a design, in which the movable actuator section should be capable of covering comparatively large distances, problems may arise with respect to the linearity of the movements to be performed.

A second embodiment of the system in accordance with the invention is characterized in that the compensator forms of the optical discs of one of the said types. In this case, the scanning device in the system in accordance with the invention dies not require any provisions to enable both types of discs to be scanned. The undesired optical effect caused by the difference in substrate thickness is eliminated by provisions on the discs themselves.

A third embodiment of the system in accordance with the invention is characterized in that the compensator forms part of the optical discs of the first type, the compensator for each of the discs having on a substrate side remote from the information layer, a contact surface for cooperation with the supporting surface of the turntable, the distance between the substrate side and the contact surface being related to the difference in thickness ($t_2-t_1$). The term substrate is to be understood to mean at least that part of the substrate which faces the information surface.

A fourth embodiment of the system in accordance with the invention is characterized in that the distance between the substrate and the contact surface is at least substantially equal to $$\sqrt{1-NA^2} \cdot \left[ \frac{t_2}{\sqrt{n_2^2-NA^2}} - \frac{t_1}{\sqrt{n_1^2-NA^2}} \right],$$

where NA is the numerical aperture of the objective, $n_1$ is the refractive index of the material of the first substrate and $n_2$ is the refractive index of the material of the second substrate.

A fifth embodiment of the system in accordance with the invention is characterized in that the compensation means of each optical disc of the first type comprise a rim which surrounds the center of the disc and which is situated outside the area of the information layer. The rim is the contact surface. This embodiment is practical, reliable and simple to realize. The rim is preferably integral with the substrate, is preferably made of the same material as the substrate, and is preferably formed simultaneously with the substrate.

A sixth embodiment of the system in accordance with the invention is characterized in that the thickness ($t_1$) of the substrate of optical discs of the first type is at least substantially 0.6 mm and the thickness ($t_2$) of the substrate of optical discs of the second type is at least substantially 1.2 mm, the first substrate being of a material having a refractive index which is at least substantially equal to the refractive index of the material of the second substrate and the distance between the substrate and the contact surface being at least substantially 0.33 mm. The refractive indices are at least substantially 1.57. The numerical aperture of the objective of the system is approximately 0.6.

A seventh embodiment of the system in accordance with the invention is characterized in that the compensator forms of the scanning device. This embodiment provides a practical solution to the problem outlined hereinbefore, if the prevailing standard specifications do not allow adaptation of the optical discs of the system.

A eight embodiment of the system in accordance with the invention is characterized in that the compensator comprise a positioning device for moving the actuator and/or the turntable relative to a frame of the scanning device in a direction at least substantially parallel to the optical axis of the objective over a positioning distance which is related to the difference in thickness ($t_2-t_1$).

A ninth embodiment of the system in accordance with the invention is characterized in that the compensator comprises a positioning unit for moving the supporting surface of the turntable relative to other parts of the turntable in a direction at least substantially parallel to the optical axis of the objective over a positioning distance which is related to the difference in thickness ($t_2-t_1$). In the two last-mentioned embodiments a desired movement can be obtained by the use of mechanical means which are known per se. Generally, an automatically operating positioning device is chosen, which is actuated upon receipt of a detection signal relating to the type of optical disc present in the scanning device.

A tenth embodiment of the system in accordance with the invention is characterized in that the positioning distance is at least substantially equal to $$\sqrt{1-NA^2} \cdot \left[ \frac{t_2}{\sqrt{n_2^2-NA^2}} - \frac{t_1}{\sqrt{n_1^2-NA^2}} \right],$$

where NA is the numerical aperture of the objective, $n_1$ is the refractive index of the material of the first substrate and $n_2$ is the refractive index of the material of the second substrate.

The invention further relates to an optical disc suitable for use in the system in accordance with the invention. The optical disc in accordance with the invention is an optical disc of the first type as defined above in the first embodiment in combination with any one of the above second through sixth embodiments.

The invention further relates to a scanning device suitable for use in the system in accordance with the invention. The scanning device in accordance with the invention is defined above in the first embodiment in combination with any one of the above seventh through tenth embodiments. The scanning device in accordance with the invention particularly comprises a positioning device for moving the entire actuator, i.e. both actuator sections, and/or the turntable relative to a frame of the scanning device in a direction parallel to the optical axis of the objective of the scanning device over a positioning distance which is related to the difference in substrate thickness of the discs to be scanned. Alternatively, the scanning device may comprise a positioning unit for moving the supporting surface of the turntable relative to the other parts of the turntable. In both cases the positioning distance is preferably equal to or substantially equal to $$\sqrt{1-NA^2} \cdot \left[ \frac{t_2}{\sqrt{n_2^2-NA^2}} - \frac{t_1}{\sqrt{n_1^2-NA^2}} \right],$$

where NA is the numerical aperture of the objective, $n_1$ is the refractive index of the material of the first substrate and $n_2$ is the refractive index of the material of the second substrate.

Those skilled in the art will understand the invention and addition objects and advantages of the invention by studying the description of preferred embodiments below with reference to the following drawings which illustrate every feature of the appended claims.

DETAILED DESCRIPTION OF THE PREFERRED EMBODIMENT

Figure 1:
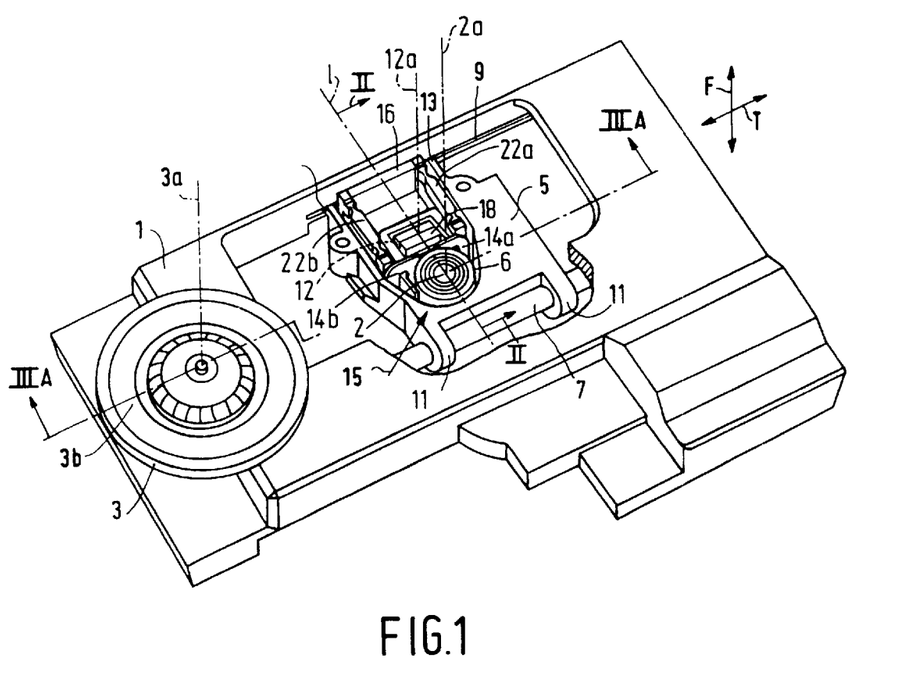
FIG. 1 is a perspective view showing a scanning device suitable for use in the system in accordance with the invention.

FIG. 1 shows a scanning device suitable for use in the system in accordance with the invention.

This scanning device comprises a frame 1, which carries an electrically drivable turntable 3 for supporting and centering optical discs, the turntable 3 being rotatable about an axis of rotation 3a and having a supporting surface 3b. The scanning device further comprises mechanical guide means for translating a slide 5 radially with respect to the turntable 3 (as indicated by an arrow T). The guide means comprise a guide rod 7 secured to the frame 1 and a guide wall 9 adapted to cooperate respectively with sliding bushes 11 and sliding surfaces 13 of the slide 5. An electric motor, not shown and supported in the frame, serves for driving the slide 5 by means or not by means of a transmission mechanism.

The slide 5 carries a scanning unit with an actuator 15, as well as a solid-state laser arranged adjacent the actuator 15. The actuator 15, which is shown in sectional view in FIG. 2, comprises a movable section 6 with an optical axis 2a, which extends parallel to the axis of rotation 3a, a focusing coil 12 with a coil axis 12a, and two tracking coils 14a, 14b. A pivotable or flexible suspension 22 connects the movable section 6 to a stationary section 16 of the actuator 15, which stationary section is secured to the slide 5 and comprises a magnetic circuit with a permanent magnet 18. The scanning unit occupies such a position relative to the slide 5 that its longitudinal axis 1 is oriented transversely to the plane defined by the axis of rotation 3a and the optical axis 2a, as a result of which the objective 2 is movable both in the focusing direction (indicated by an arrow F) and in a tracking direction (indicated by an arrow T).

In operation, for the purpose of roughly following an information track disposed in the plane of an information surface of an optical disc situated on the turntable, the slide is moved along a radial path, indicated by the arrow T, with respect to the axis of rotation 3a of the turntable 3. As the information track may be slightly off-centered on the optical disc lying on the turntable and the turntable may also exhibit small radial deviations, allowance is made for small radial excursions of the information track during rotation. The deviations which may occur in operation between the position of a scanning spot formed on the information surface of the disc by the objective and the position of the track portion to be scanned are reduced by means of a radial tracking system which includes the scanning unit 15, the objective 2 performing small high-frequency tracking movements in accordance with the arrow T.

Figures 3A, 3B:
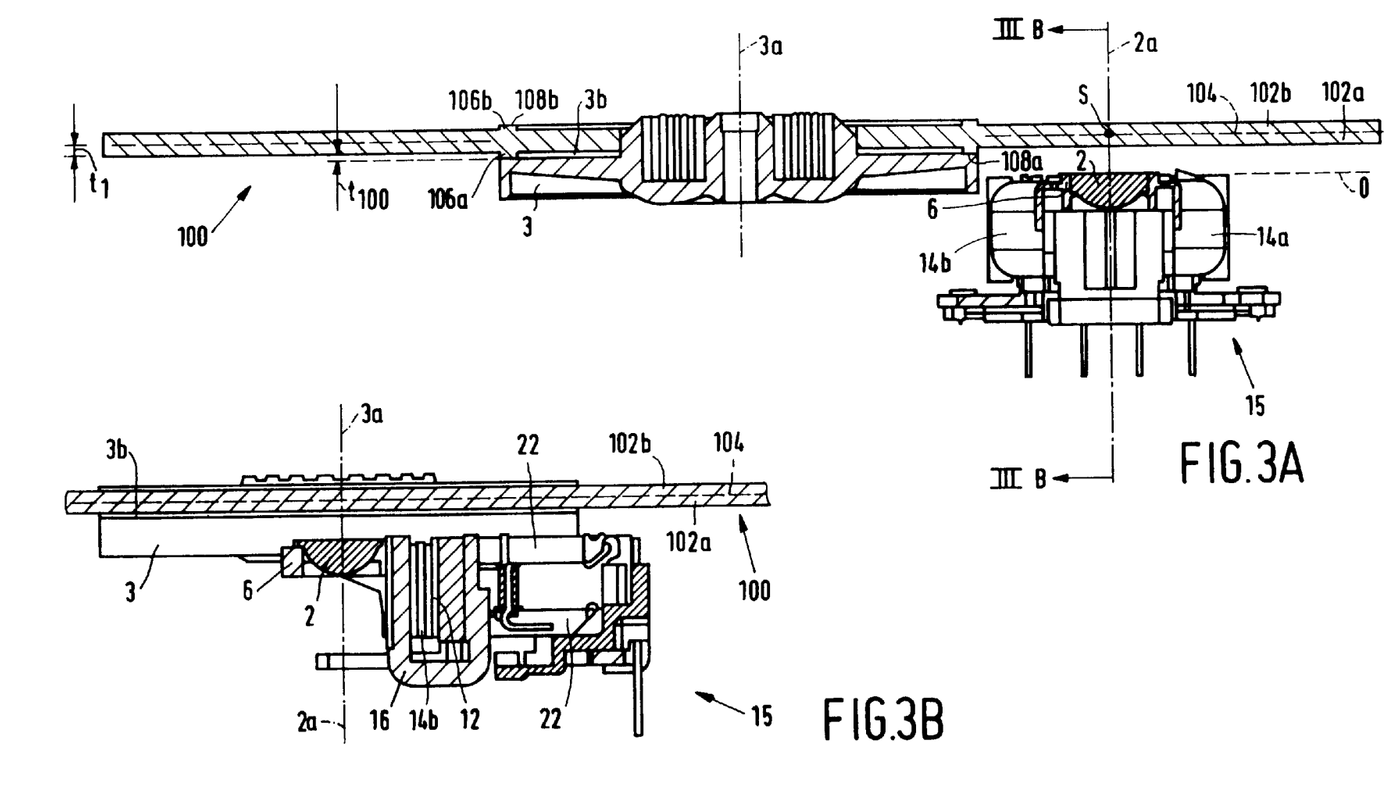
FIG. 3A is a diagrammatic sectional view taken on the line IIIA—IIIA in FIG. 1 and showing an embodiment of the system in accordance with the invention when an optical disc of a first type is present.
FIG. 3B shows the embodiment of FIG. 3A in a sectional view taken on the line IIIB—IIIB in FIG. 3A.
Figures 4A, 4B:
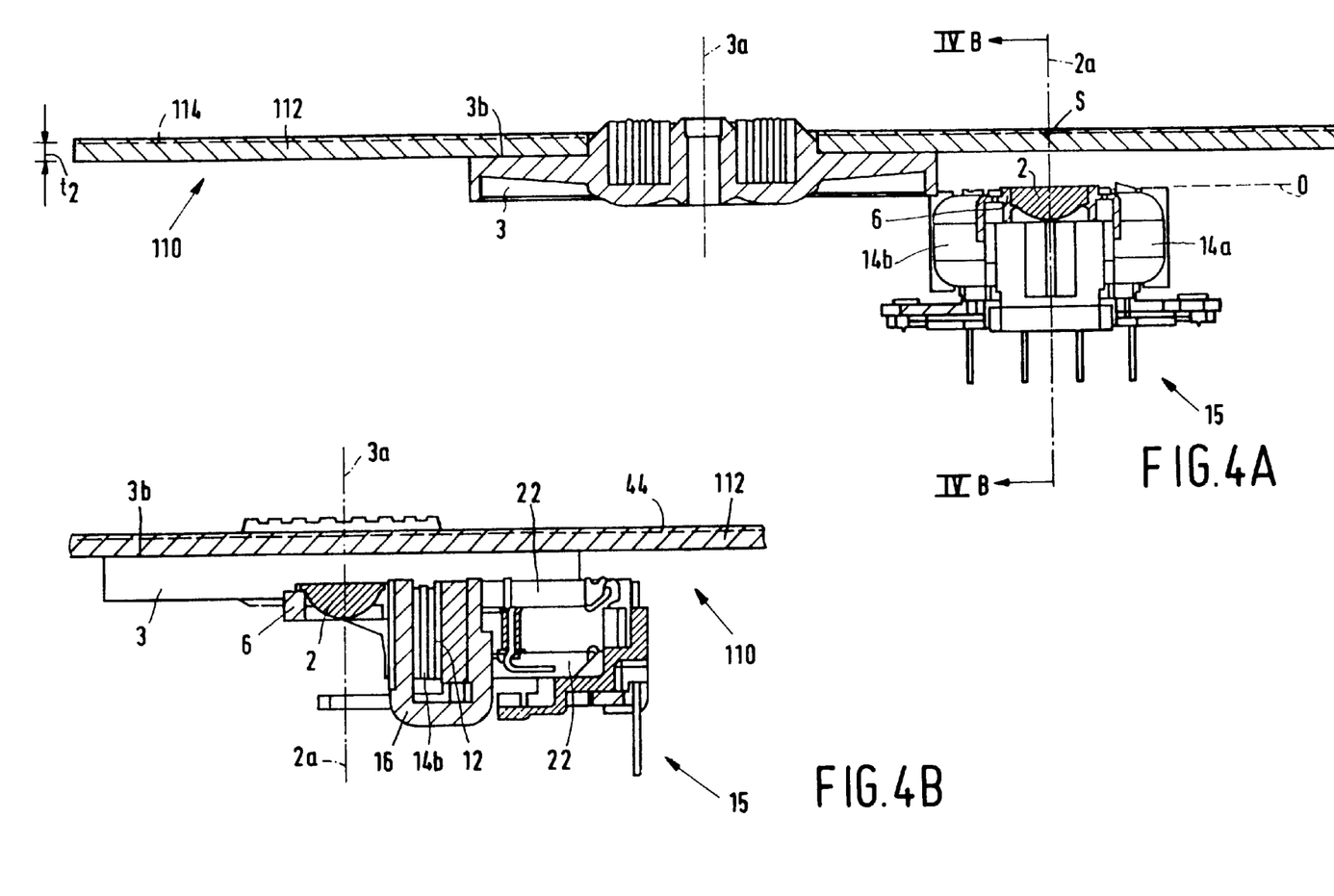
FIG. 4A shows the embodiment of FIG. 3A in a diagrammatic sectional view taken on the line IIIA—IIIA in FIG. 1, the optical disc of the first type having been replaced by an optical disc of a second type.
FIG. 4B shows the embodiment of FIG. 4A in a sectional view taken on the line IVB—IVB in FIG. 4A.

The system in accordance with the invention includes optical discs of a first type, which discs in the present example have two optically transparent substrates between which one or two optically scannable are disposed. FIGS. 3A and 3B show an example of such a disc, which disc is referred to as a DVD. The disc bears the reference numeral 100, the substrates bear the numerals 102a and 102b, and the information layer or layers bear the numeral 104. The substrates 102a and 102b each have a substrate thickness $t_1$ directly over the information layer of 0.6 mm. The system in accordance with the invention further includes optical discs of a second type, in the present example compact discs (CDs). An example of a such a disc is shown in FIGS. 4A and 4B. The compact disc 110 shown therein has an optically transparent substrate 112 with a substrate thickness $t_2$ directly over the information layer of 1.2 mm, on which an information layer 114 is disposed. In operation the information layer of each type of disc is scanned by means of a scanning spot formed by a radiation beam traversing the substrate carrying the information layer. In the present example the substrates are made from a polycarbonate.

Figure 2:
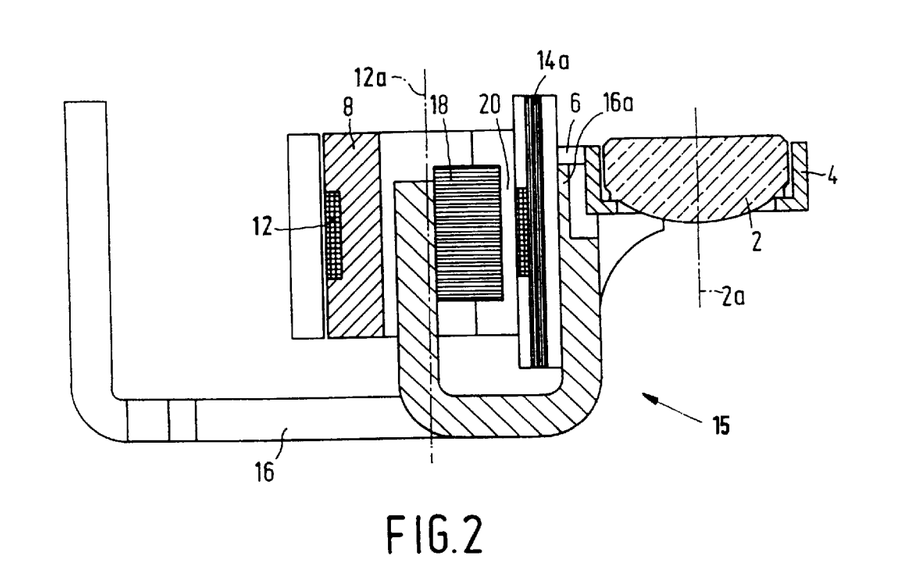
FIG. 2 shows the scanning unit used in the scanning device of FIG. 1 in a sectional view taken on the line II—II in FIG. 1.

The embodiment of the system in accordance with the invention shown in FIGS. 3A, 3B, 4A, 4B may comprise a scanning device as shown in FIGS. 1 and 2 or a variant thereof. For the sake of simplicity corresponding parts in FIGS. 1, 2 and FIGS. 3A, 3B, 4A, 4B bear the same reference numerals. The movable actuator section 6 has a center position O relative to which in operation small focusing movements in accordance with the arrow F in FIG. 1 are possible in order to keep a scanning spot S formed by the objective 2 accurately in the plane of the information surface 104 or 114. The difference in thickness $(t_2-t_1)$ between the substrates 112 and 102a is compensated for by the provision of a compensation means in the form of a rim 106a which surrounds a center hole of the optical disc 100. The rim 106a has a contact surface 108a, which engages with the supporting surface 3b of the turntable 3. In the present example the disc 100 also has a rim 106b similar to the rim 106a and having a contact surface 108b. The thickness $t_{100}$ of the rim 106a and the rim 106b, respectively, corresponds to $$\sqrt{1-NA^2} \cdot \left[ \frac{t_2}{\sqrt{n_2^2-NA^2}} - \frac{t_1}{\sqrt{n_1^2-NA^2}} \right],$$

where $n_1$ and $n_2$ are the refractive indices of the material of the substrate 102a/102b and 112, respectively, and where NA is the numerical aperture of the objective. In the present example $n_1=n_2=1.57$ and NA is 0.6. The thickness $t_{100}$ is consequently 0.33 mm.

Figure 5A:
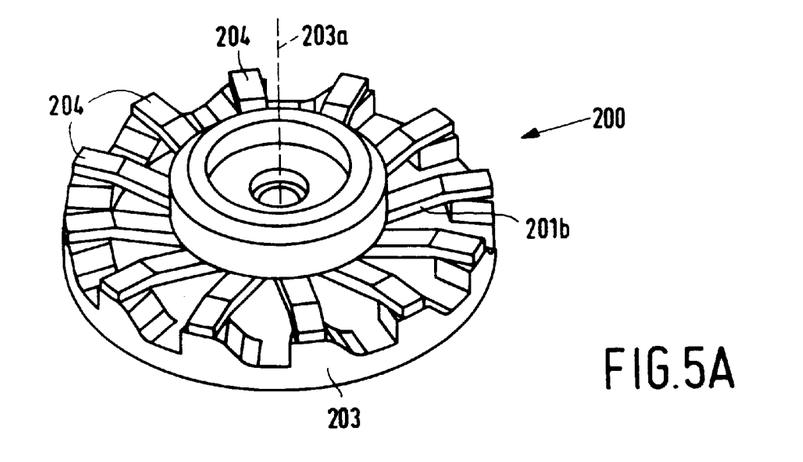
FIG. 5A is a perspective view showing an example of a positioning unit for positioning a supporting surface of a turntable, which unit is suitable for use in the system in accordance with the invention and is shown in a first position.
Figure 5B:
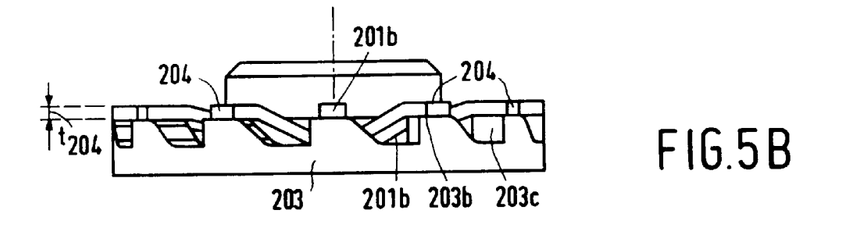
FIG. 5B is a radial view showing the positioning unit of FIG. 5A in the first position.
Figure 6A:
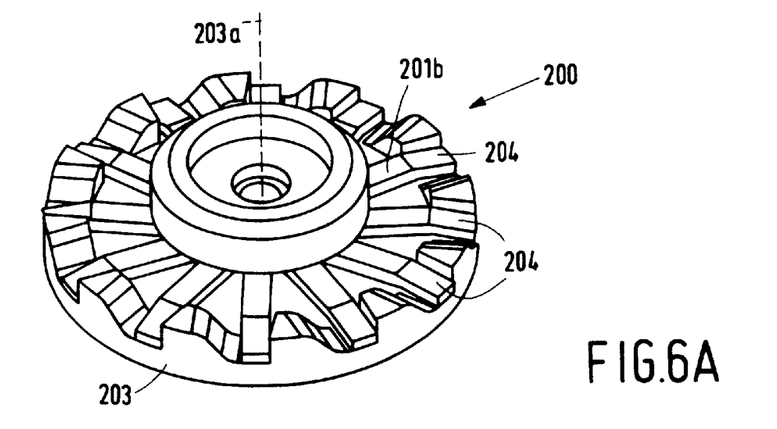
FIG. 6A is a perspective view showing the positioning unit of FIG. 5A in a second position.
Figure 6B:
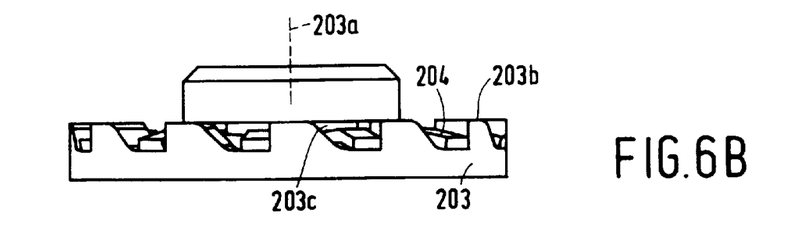
FIG. 6B is a radial view showing the positioning unit of FIG. 6A in the second position.

The positioning unit 200 shown in FIGS. 5A, 5B, 6A and 6B is suitable as a compensation means in the system in accordance with the invention, if optical discs having mutually different substrate thicknesses are used, without the discs themselves of either type having compensation means. The positioning unit 200 takes the form of an element having a central portion 201a with radially projecting limbs 201b and arranged on a turntable 203 of a scanning device, which turntable is rotatable about an axis of rotation 203a. The limbs 201b, which are resilient in a direction parallel to the axis of rotation 203a, have end portions 204. The positioning unit 200 is rotatable relative to the turntable 203 about the axis of rotation 203a between a first position, as is shown in FIGS. 5A and 5B, and a second position, as is shown in FIGS. 6A and 6B. In the first position the end portions 204 are disposed on a supporting surface 203b of the turntable 203, the end portions 204 together defining a supporting surface 204b for supporting an optical disc of the first type. In the second position the end portions 204 engage in recesses 203c of the turntable 203 and the supporting surface 203b of the turntable forms a supporting surface for supporting an optical disc of the second type. The positioning unit 200 can be actuated by hand, electrically or electromechanically. It is obvious that instead of the positioning unit shown other positioning constructions can be used.

The end portions 204 have a thickness $t_{204}$ which is related to the thickness difference between the thickness $t_2$ of the substrate of the optical disc of the second type and the thickness $t_1$ of the thinner substrate of the optical disc of the first type. As a matter of fact, the thickness $t_{204}$ is equal to $$\sqrt{1-NA^2} \cdot \left[ \frac{t_2}{\sqrt{n_2^2 - NA^2}} - \frac{t_1}{\sqrt{n_1^2 - NA^2}} \right],$$

where NA is the numerical aperture of the objective used in the scanning device, $n_1$ is the refractive index of the material of the substrate of the optical disc of the first type and $n_2$ is the refractive index of the material of the substrate of the optical disc of the second type.

Figure 7:
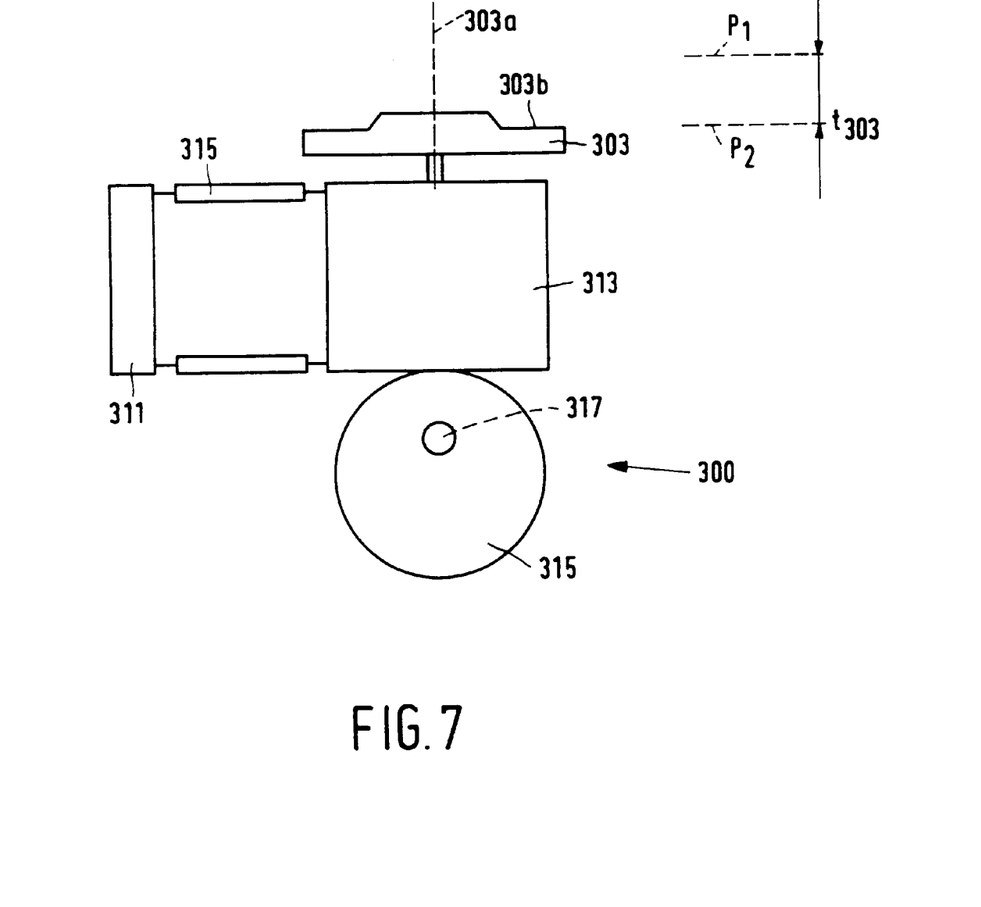
FIG. 7 shows diagrammatically an example of a positioning device for positioning a turntable, which device is suitable for use in the system in accordance with the invention.

In the embodiment of the system in accordance with the invention shown partly in FIG. 7 the compensation means comprise a positioning device 300 for moving a turntable 303 relative to a frame 311 of the scanning device in a direction parallel to the optical axis of an objective present in the scanning device of the system. The turntable, which is rotatable about an axis 393a and which has a supporting surface 303b, is supported in an element 313 which is connected to the frame 311 by means of a flexible suspension device 313. In the present example the element 313 is supported by a cylindrical element 315, which is eccentrically rotatable about a spindle 317. The turntable 303 can be moved over a distance $t_{303}$ by rotating the element 300. It is obvious that instead of the positioning device shown it is also possible to use other positioning constructions. As already described in the present document, the system in accordance with the invention includes optical discs of a first type having a substrate thickness $t_1$ and optical discs of a second type having a greater substrate thickness $t_2$. In the situation shown the turntable 303 is in a position (P2) for cooperation with a disc of the second type; after a movement over the distance $t_{303}$ the turntable occupies a position (P1) for cooperation with a disc of the first type. In both situations the movable section of the actuator used in the scanning device of the system can be moved from the same reference position in order to perform focusing movements. The distance $t_{303}$ is equal to $$\sqrt{1-NA^2} \cdot \left[ \frac{t_2}{\sqrt{n_2^2 - NA^2}} - \frac{t_1}{\sqrt{n_1^2 - NA^2}} \right],$$

where NA is the numerical aperture of the objective used in the scanning device, $n_1$ is the refractive index of the material of the substrate of the optical disc of the first type and $n_2$ is the refractive index of the material of the substrate of the optical disc of the second type. In the present example the refractive indices $n_1$ and $n_2$ are 1.57 and the numerical aperture NA is 0.6. The positioning distance $t_{303}$ is 0.33 mm.

Figure 8A:
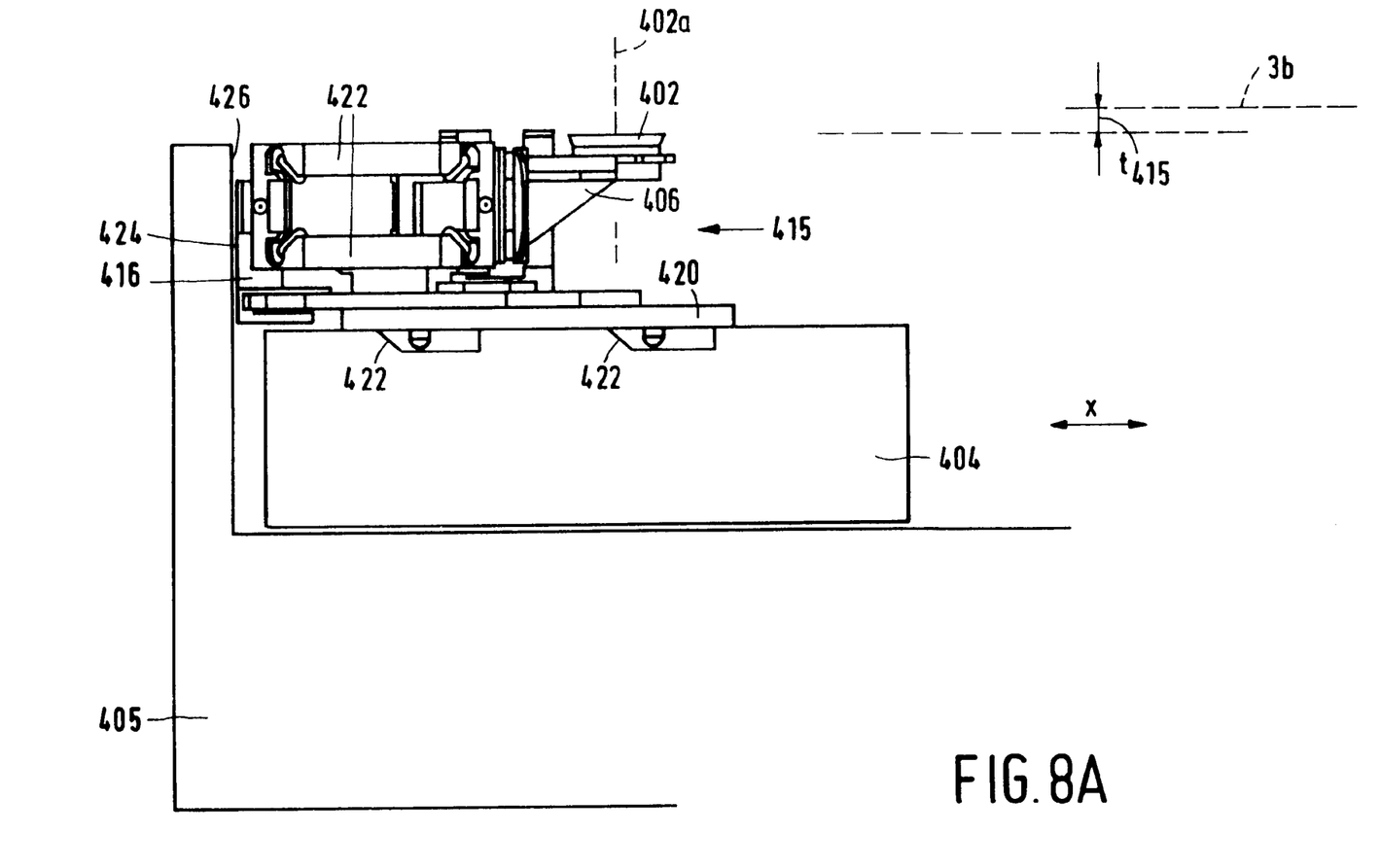
FIG. 8 shows diagrammatically an example of a positioning device for positioning an actuator, which device is suitable for use in the system in accordance with the invention and occupies a first position.
Figure 8B:
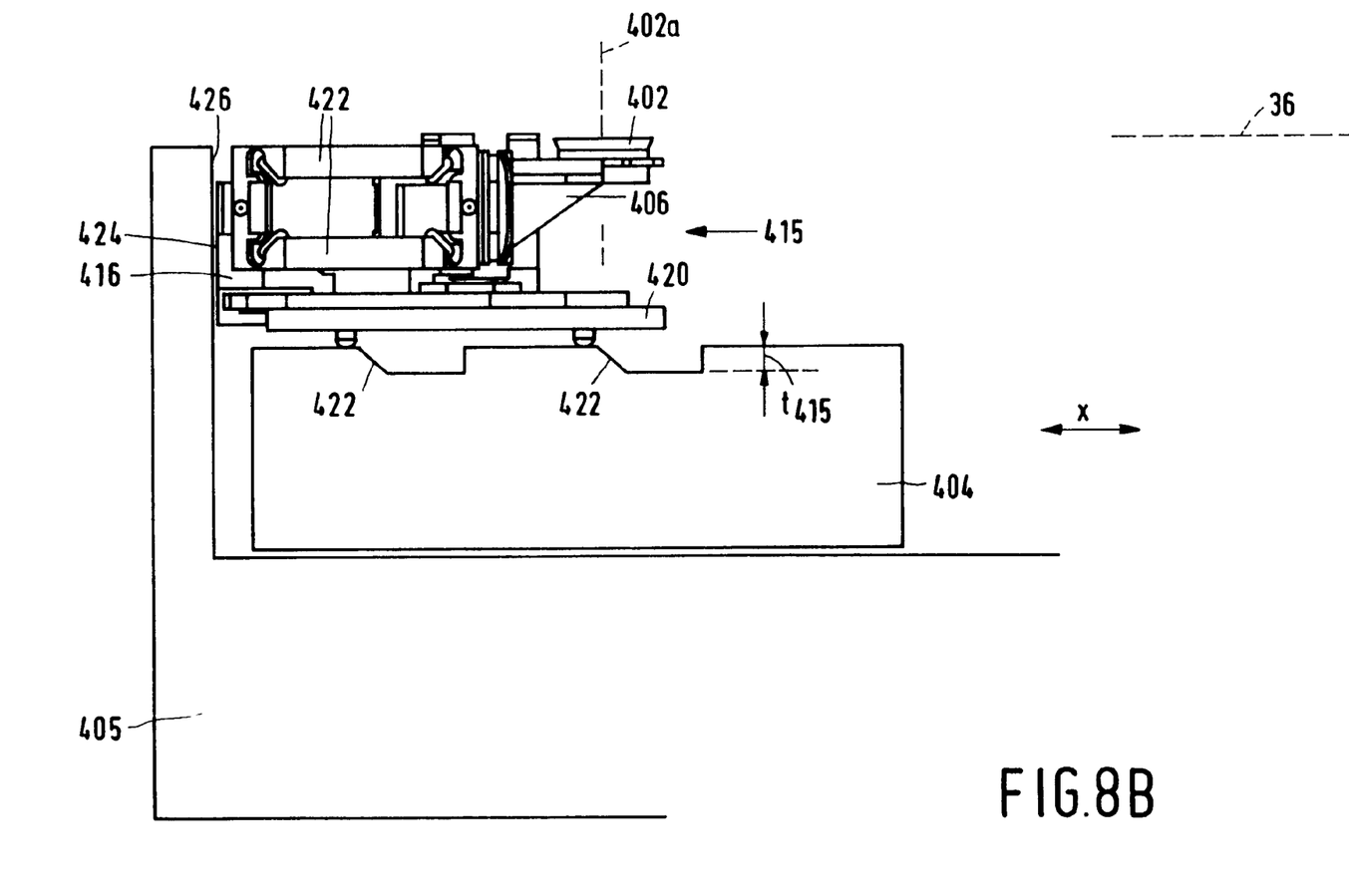
FIG. 8B shows the positioning device of FIG. 8A in a second position.

The scanning device in accordance with the invention shown partly in FIGS. 8A and 8B is suitable for scanning optical discs of a first type, i.e. discs having a substrate thickness $t_1$, and optical discs of a second type, i.e. discs having a substrate thickness $t_2$, $t_2$ being greater than $t_1$. The scanning device has been provided with a frame and a turntable in a manner as shown in FIG. 1. FIGS. 8A and 8B only show the level of the supporting surface 3b of the turntable. The scanning device further comprises a slide 405 having a scanning unit with an actuator 415, the slide 405 corresponding to the slide 5 in FIG. 1 and the actuator 415 being a variant of the actuator 15 shown in FIG. 1. The actuator 415 comprises a stationary actuator section 416 secured to a sliding element 404 and a movable actuator section 406 coupled to the actuator section 416 via a flexible suspension 422. The movable actuator section 406 carries an objective 402 with an optical axis 402a, the objective being movable in focusing directions and tracking directions in a manner similar to that illustrated in FIG. 1. The sliding element 404, which preferably forms part of an electrical sliding device, is movable relative to the slide 405 in directions x transverse to the optical axis 402a for the purpose of moving the actuator 415 parallel to the optical axis 402a over a distance $t_{415}$.

The movement of the actuator 415 is derived from the sliding movement of the sliding element 404, a guide member 420 of the actuator 415 cooperating with guide surfaces 422 of the sliding element 404, and a sliding surface 424 of the actuator 415 cooperating with a straight-line guide 426 of the frame.

In FIG. 8A the actuator 415 occupies a position relative to the turntable in which optical discs of the first type can be scanned. In FIG. 8B the actuator 415 occupies a position relative to the turntable in which optical discs of the second type can be scanned. In both situations the movable section 416 can be moved from the same reference position in order to perform focusing movements parallel to the optical axis 402a, so that in both situations the movable section 416 has the same travel or amplitude. The distance $t_{415}$ is equal to $$\sqrt{1-NA^2} \cdot \left[ \frac{t_2}{\sqrt{n_2^2 - NA^2}} - \frac{t_1}{\sqrt{n_1^2 - NA^2}} \right],$$

where NA is the numerical aperture of the objective, $n_1$ is the refractive index of the transparent substrate of discs of the first type and $n_2$ is the refractive index of the transparent substrate of discs of the second type.

It is to be noted that the invention is not limited to the embodiments disclosed herein. Many variants to the embodiments shown are possible within the scope of the invention. It is essential, however, that there are compensation means in order to compensate for the difference in thickness ($t_2-t_1$) between transparent substrates of various optical discs which can be scanned by means of the scanning device in accordance with the invention, so that for scanning discs with a thinner substrate the movable section of the actuator need not perform larger movements in the focusing directions than necessary for scanning discs with a thicker substrate. In other words, when the compensation means as proposed are used an actuator which is suitable for scanning an optical disc having a substrate of a given thickness is automatically suitable for scanning a disc having a thinner substrate if scanning is effected through the substrate in both cases.

The invention has been disclosed with reference to specific preferred embodiments, to enable those skilled in the art to make and use the invention, and the describe the best mode contemplated for carrying out the invention. Those skilled in the art may modify or add to these embodiments or provide other embodiments without departing from the spirit of the invention. Thus, the scope of the invention is only limited by the following claims:

I claim:

1. A system comprising optical discs of a first type and optical discs of a second type, each type of optical disc having an optically transparent substrate and an optically scannable information layer present on the substrate, the substrates of the optical discs of the first type, having a first substrate thickness ($t_1$) directly over the information layer and the substrates of the optical discs of the second type having a second substrate thickness ($t_2$) directly over the information layer, said thickness ($t_2$) being significantly greater than the first substrate thickness, a scanning device which is capable of scanning optical discs of both types and which comprises a turntable having a supporting surface for carrying an optical disc of each type and a scanning unit comprising an actuator and objective means having an optical axis, for focusing a radiation beam passing through the substrate of an optical disc situated on the turntable so as to form a scanning spot on the information surface, which actuator comprises a first actuator section and a second actuator section including the objective means, which second actuator section is movable relative to the first actuator section; and compensation means for compensating for the difference in thickness ($t_2-t_1$) between substrates of optical discs of said first and second types, said compensation means forming part of the optical discs of one of said first and second types, so that both during scanning of an optical disc of the first type and during scanning of an optical disc of the second type the second actuator section is movable both in a first direction at least substantially parallel to the optical axis and in a second direction opposite to the first direction, starting from the same reference position for the purpose of focusing.

2. The system of claim 1 wherein the compensation means form part of the optical discs of the first type; the compensation means of each of said first type of discs having, on a substrate side remote from the information layer, a contact surface for cooperation with the supporting surface of the turntable; and the distance between said substrate side and the contact surface depending on the thicknesses $t_1$ and $t_2$.

3. The system of claim 2, in which the distance between the substrate and the contact surface of an optical disk is at least substantially equal to $$\sqrt{1 - NA^2} \cdot \left[ \frac{t_2}{\sqrt{n_2^2 - NA^2}} - \frac{t_1}{\sqrt{n_1^2 - NA^2}} \right],$$

where NA is the numerical aperture of the objective, $n_1$ is the refractive index of the material of the first substrate and $n_2$ is the refractive index of the material of the second substrate.

4. The system of claim 2 in which the compensation means of each optical disc of the first type comprise a rim which surrounds the center of the disc and which is situated outside the area of the information layer, which rim comprises the contact surface.

5. The system of claim 2 in which the scanning means and compensating means include means for scanning and compensating when the thickness ($t_1$) of the substrate of optical discs of the first type is at least substantially 0.6 mm; the thickness ($t_2$) of the substrate of optical discs of the second type is at least substantially 1.2 mm; the first substrate being of a material having a refractive index which is at least substantially equal to the refractive index of the material of the second substrate; and the distance between the substrate and the contact surface being at least substantially 0.33 mm.

6. A system as in claim 1 wherein each said optical disc of the first type comprises two substrates sandwiched together, at least one of said sandwiched together substrates being a first said substrate having thereon an information layer, said information layer being between said sandwiched together substrates.

7. A system as in claim 6 wherein each of said sandwiched together substrates has a thickness ($t_1$).

8. A first optical disk of a first type, comprising:

an optically transparent first substrate of thickness ($t_1$) which is significantly less than the thickness ($t_2$) of an optically transparent second substrate over a second information layer of a second type of optical disk, said thickness ($t_2$) being measured directly over said second information layer, a first information layer on a first side of the first substrate, said thickness ($t_1$) being measured directly over said first information layer;

and in which:

the first optical disk is adapted for insertion into a scanning device which is capable of scanning optical disks of both types, and which includes: a turntable having a supporting surface for carrying an optical disc of each type; and a scanning unit including an actuator and objective means having an optical axis, for focusing a radiation beam passing through the substrates of optical disks situated on the turntable so as to form a scanning spot on the information surface; and in which the actuator includes a first actuator section and a second actuator section which includes the objective means; and the second actuator section is movable relative to the first actuator section; and the first optical disk further comprises compensation means for compensating for the difference in thickness between the substrates of the optical disks of the two different types, so that both during scanning of an optical disk of the first type and during scanning of the optical disk of the second type the second actuator section, starting from the same reference position is movable both in a first direction and in a second direction opposite to the first direction depending on the type of optical disk, for the purpose of focusing the spot.

9. The optical disk of claim 8, in which the substrate thickness ($t_1$) of the optical disks of the first type is less than the substrate thickness ($t_2$) of the optical disks of the second type; the compensation means form part of the optical discs of the first type; the compensation means of each of the optical discs of the first type having, on a substrate side remote from the information layer, a contact surface for cooperation with the supporting surface of the turntable; and the distance between said substrate side and the contact surface depending on the thickness $t_1$ and the thickness $t_2$.

10. The optical disk of claim 9, in which the distance between the substrate and the contact surface of the first optical disk is at least substantially equal to $$\sqrt{1 - NA^2} \cdot \left| \frac{t_2}{\sqrt{n_2^2 - NA^2}} - \frac{t_1}{\sqrt{n_1^2 - NA^2}} \right|,$$

where NA is the numerical aperture of the objective, $n_1$ is the refractive index of the material of the first substrate and $n_2$ is the refractive index of the material of the second substrate.

11. The optical disk of claim 9, in which the compensation means of each optical disc of the first type comprise a rim which surrounds the center of the disc and which is situated outside the area of the information layer, which rim comprises the contact surface.

12. The optical disk of claim 9, in which the thickness ($t_1$) of the substrate of optical discs of the first type is at least substantially 0.6 mm; the thickness ($t_2$) of the substrate of optical discs of the second type is at least substantially 1.2 mm; the first substrate being of a material having a refractive index which is at least substantially equal to the refractive index of the material of the second substrate; and the distance between the substrate and the contact surface being at least substantially 0.33 mm.

13. A first optical disc as in claim 8 wherein said first optical disc comprises two substrates sandwiched together, at least one of said sandwiched together substrates being a first said substrate having thereon a first information layer, said information layer being between said sandwiched together substrates.

14. A first optical disc as in claim 13 wherein each of said sandwiched together substrates has said thickness ($t_1$).

* * * * *